A. HEARTSILL.
RECIPROCATING-CHURN.
No. 191,142. Patented May 22, 1877.
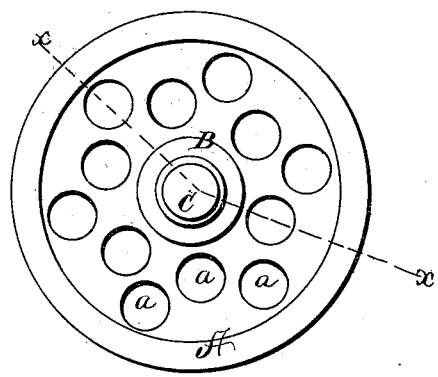
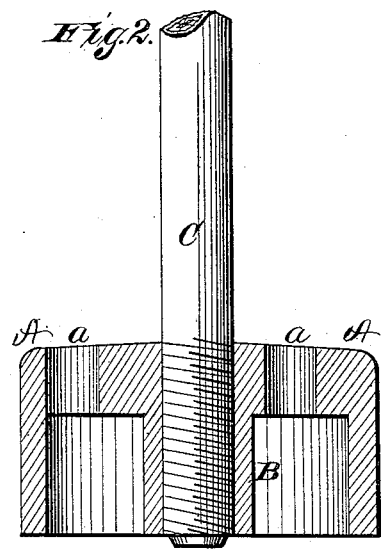
WITNESSES
Franck L. Ourand
H. N. Miller
INVENTOR
Abram Heartsill
Hauder Mason
ATTORNEYS.
N. PETERS, PHOTO-LITHOGRAPHER, WASHINGTON, D. C.

UNITED STATES PATENT OFFICE.

ABRAM HEARTSILL, OF LOUISVILLE, TENNESSEE.

IMPROVEMENT IN RECIPROCATING CHURNS.

Specification forming part of Letters Patent No. 191,142, dated May 22, 1877; application filed March 26, 1877.

*To all whom it may concern:*

Be it known that I, ABRAM HEARTSILL, of Louisville, in the county of Blount and in the State of Tennessee, have invented certain new and useful Improvements in Churn-Dashers; and do hereby declare that the following is a full, clear, and exact description thereof, reference being had to the accompanying drawings, and to the letters of reference marked thereon, making a part of this specification.

The nature of my invention consists in the construction of a dasher for churns in the peculiar manner hereinafter described.

To enable those skilled in the art to make and use my invention, I will proceed to describe its construction and operation.

In the accompanying drawings, making part of this specification, Figure 1 represents a bottom view, and Fig. 2 a section.

In the figures, A represents the dasher-body, which consists of an inverted cup, which is provided with a hub, B, and also with a series of holes, $a\ a$. The hub B is provided with a screw-thread, and so is the dasher-handle C. The dasher-handle screws into the hub B.

In using this dasher, the cream or milk is caught in the cup as it is forced downward, and is forced through the openings $a\ a$. The cup acts as an air-reservoir, as, also, a means of forcing the cream through openings to break the globules.

It will be noticed that the sides of the inverted cup are perfectly vertical, and the top is made convex; hence there is very little resistance in the upward movement of the dasher, while in the downward movement a powerful agitation and cutting of the cream is obtained.

Having thus fully described my invention, what I claim as new, and desire to secure by Letters Patent, is—

The inverted cup A, constructed with vertical sides, and convex on its top, and provided with the perforations $a$, and with the hollow downwardly-projecting hub B, having interior screw-threads, in combination with the dasher-rod C, screwed into said hub, substantially as herein shown and described.

In testimony that I claim the foregoing I have hereunto set my hand this 16th day of March, 1877.

ABRAM HEARTSILL.

Witnesses:
   C. R. LOVE,
   P. P. MISER.